US012443963B2

(12) United States Patent
Appel et al.

(10) Patent No.: US 12,443,963 B2
(45) Date of Patent: Oct. 14, 2025

(54) LICENSE COMPLIANCE FAILURE RISK MANAGEMENT

(71) Applicant: International Business Machines Corporation, Armonk, NY (US)

(72) Inventors: Ana Paula Appel, São Paulo (BR);
Manuel Soares Pereira Da Rocha Junior, São Paulo (BR); Carlos Eduardo Buzeto, São Paulo (BR);
Allana Paola Paoli Neves, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 18/317,684

(22) Filed: May 15, 2023

(65) Prior Publication Data

US 2024/0386439 A1 Nov. 21, 2024

(51) Int. Cl.
*G06Q 30/018* (2023.01)
*G06Q 50/26* (2024.01)

(52) U.S. Cl.
CPC .......... *G06Q 30/018* (2013.01); *G06Q 50/26* (2013.01)

(58) Field of Classification Search
None
See application file for complete search history.

(56) References Cited

U.S. PATENT DOCUMENTS

| | | | |
|---|---|---|---|
| 8,763,159 B1 | 6/2014 | Kobets et al. | |
| 8,818,837 B2 * | 8/2014 | McCalmont | G06Q 10/0637 707/999.102 |
| 9,699,195 B2 * | 7/2017 | Ito | H04L 63/102 |
| 9,967,285 B1 * | 5/2018 | Rossman | G06F 16/22 |
| 10,282,468 B2 | 5/2019 | Kim et al. | |
| 10,303,999 B2 | 5/2019 | Hertz et al. | |
| 10,607,736 B2 | 3/2020 | Eggebraaten et al. | |
| 11,182,545 B1 | 11/2021 | Tsai et al. | |

(Continued)

FOREIGN PATENT DOCUMENTS

| | | |
|---|---|---|
| CN | 103810405 B | 4/2017 |
| CN | 109739939 A | 5/2019 |

(Continued)

OTHER PUBLICATIONS

"Assessing regulatory fairness through machine learning," Source: Stanford University, Mar. 8, 2021, copyright 1995-2022, Science Daily, accessed Mar. 16, 2023, 3 pages. https://www.sciencedaily.com/releases/2021/03/210308134043.htm.

(Continued)

*Primary Examiner* — Andrew B Whitaker
(74) *Attorney, Agent, or Firm* — Yee & Associates, P.C.

(57) ABSTRACT

Managing licenses is provided. Evidence required for compliance with conditions set forth in a license is received from a client device of a designated user via a network. An analysis of the evidence is performed using machine learning based on a set of criteria to determine whether the evidence is valid. It is determined, using machine learning, whether the evidence is valid based on the analysis of the evidence. The evidence required for the compliance with the conditions set forth in the license is sent to a regulatory agency via the network to maintain the license for an entity in response to the determining that the evidence is valid based on the analysis of the evidence.

20 Claims, 5 Drawing Sheets

(56) References Cited

U.S. PATENT DOCUMENTS

| | | | |
|---|---|---|---|
| 11,222,052 | B2 | 1/2022 | Hertz et al. |
| 11,257,073 | B2 | 2/2022 | Padmanabhan |
| 11,321,631 | B1 | 5/2022 | Chan et al. |
| 2011/0282878 | A1 | 11/2011 | Bird et al. |
| 2011/0295575 | A1* | 12/2011 | Levine ............... G06F 17/10 703/2 |
| 2012/0004945 | A1* | 1/2012 | Vaswani ............. G06Q 10/06 705/7.28 |
| 2013/0346328 | A1* | 12/2013 | Agle ............... G06Q 10/0635 705/317 |
| 2015/0262105 | A1* | 9/2015 | Jeffries ............ G06Q 10/0635 705/7.26 |
| 2018/0053128 | A1* | 2/2018 | Costas ................ G06Q 50/18 |
| 2019/0155898 | A1 | 5/2019 | Li et al. |
| 2019/0251452 | A1 | 8/2019 | Adderly et al. |
| 2021/0096974 | A1* | 4/2021 | Ranchal .............. G06N 20/00 |
| 2021/0192346 | A1* | 6/2021 | Taylor ................ G06N 3/044 |
| 2021/0342962 | A1* | 11/2021 | Budlong .............. G06Q 10/06 |
| 2022/0291666 | A1* | 9/2022 | Cella ................ G06F 18/241 |
| 2023/0018159 | A1* | 1/2023 | Barroso ............... G06F 8/35 |
| 2023/0062941 | A1* | 3/2023 | Ozvat ............. G06Q 10/0635 |
| 2023/0083833 | A1* | 3/2023 | Matta ................ G01S 17/46 356/5.01 |
| 2023/0177438 | A1* | 6/2023 | Gupta ................ G06F 40/40 705/7.37 |
| 2023/0350874 | A1* | 11/2023 | Arneault .............. G06F 16/215 |
| 2023/0368214 | A1* | 11/2023 | Suryanarayana ...... G06Q 50/18 |
| 2024/0013005 | A1* | 1/2024 | Ramezani ............ G06V 30/413 |
| 2024/0078492 | A1* | 3/2024 | Abramowitz ....... G06Q 10/0635 |
| 2025/0117128 | A1* | 4/2025 | Omoigui ............... G06F 3/0482 |

FOREIGN PATENT DOCUMENTS

| | | |
|---|---|---|
| CN | 112100404 B | 10/2021 |
| JP | 6861698 B2 | 4/2021 |
| NL | 1017126 C2 | 7/2002 |

OTHER PUBLICATIONS

"IBM License Management, Understanding Financial Liability and Optimizing Licenses," Squalio Global, copyright 2020, accessed May 15, 2023, 11 pages. https://squalio.com/services/IBM-license-management/.

"RDF Environmental Sector Governance Solutions," Revenue Development Foundation, Brochure, Mar. 2018 ,8 pages. https://erp.revenuedevelopment.org/fr_FR/page/environment-license-management.

Alattas et al., "Extract Compliance-Related Evidence Using Machine Learning," 14th IEEE International Conference on Computational Intelligence and Communication Networks (CICN), Dec. 4-6, 2022, Al-Khobar, Saudi Arabia, 6 pages. https://ieeexplore.ieee.org/abstract/document/10008324.

Frey, "Putting machine learning to use in natural resource management—improving model performance," Ecology and Society, Issue 25, vol. 4, Art 45, 2020, 33 pages. https://www.ecologyandsociety.org/vol25/iss4/art45/.

Herbert et al., "A Novel Method for Decentralised Peer-to-Peer Software License Validation Using Cryptocurrency Blockchain Technology," Proceedings of the 38th Australasian Computer Science Conference (ACSC 2015), vol. 27, Sydney, Australia, Jan. 27-30, 2015, 10 pages. https://www.researchgate.net/publication/283655502.

Hidayat et al., "The Implementation of Artificial Intelligence in the Environmental Licensing Process," Proceedings of the International Webinar on Digital Architecture 2021 (IWEDA 2021), Advances in Social Science, Education and Humanities Research, vol. 671, Jul. 8, 2022, 6 pages. https://www.atlantis-press.com/proceedings/iweda-21/125975713.

Lonardo et al., "To License Or Not To License Reexamined: An Updated Report On State Statutes Regarding Private Investigators And Digital Examiners," The Journal of Digital Forensics, Security and Law, vol. 10, No. 1, 2015, 13 pages. https://commons.erau.edu/jdfsl/vol10/iss1/4/.

Lima et al., "The Brazilian Audit Tribunal's role in improving the federal environmental licensing process", Environmental Impact Assessment Review, vol. 30, 2010, pp. 108-115.

* cited by examiner

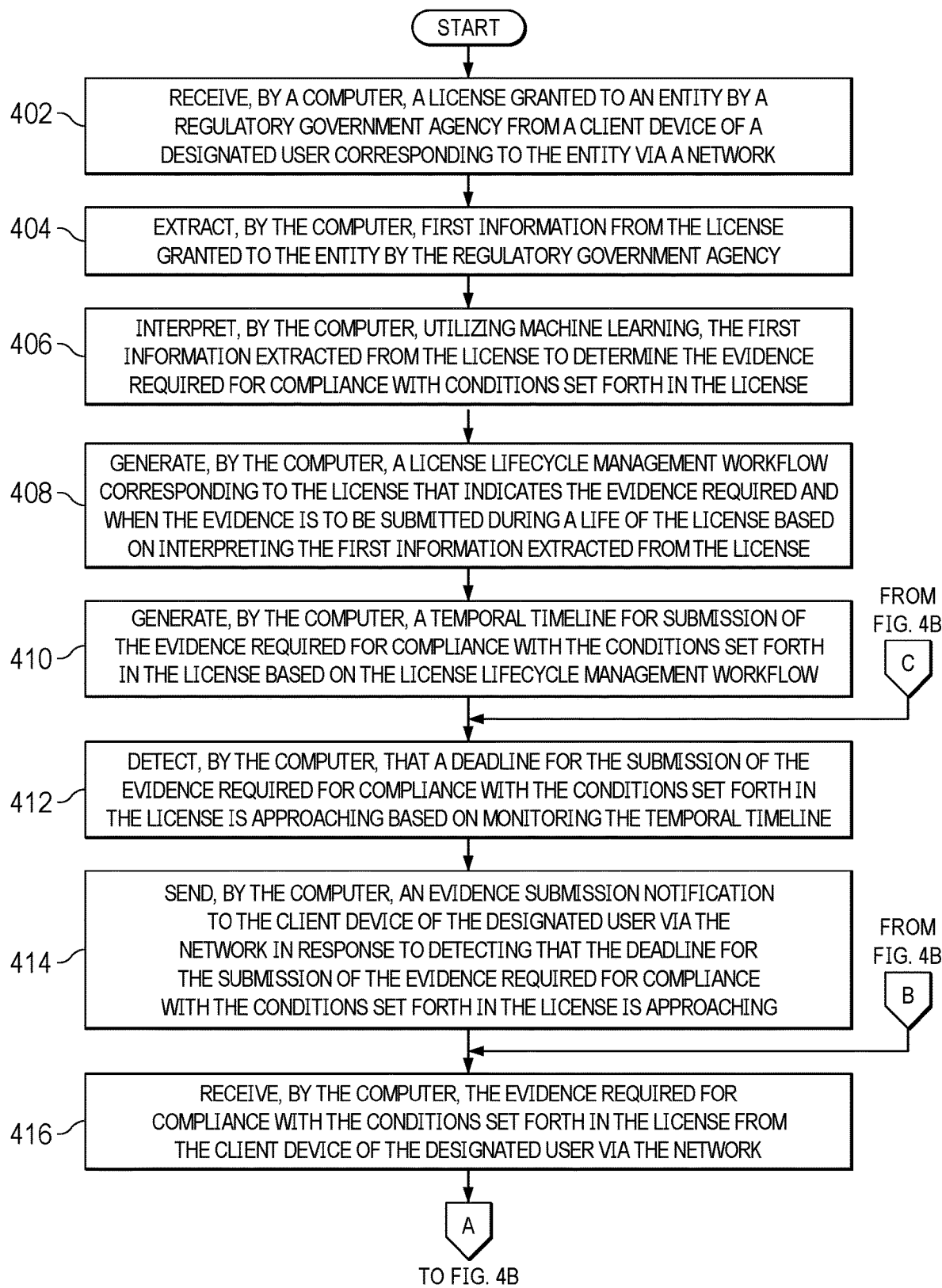

LICENSE COMPLIANCE FAILURE RISK MANAGEMENT

BACKGROUND

The disclosure relates generally to licenses and more specifically to managing the risk of failing to comply with conditions set forth in a license granted to an entity by a regulatory government agency.

If an entity, such as, for example, a company, business, enterprise, institution, organization, or the like, is involved in activities supervised and regulated by a government agency, then the entity may need to obtain a license to operate. As used herein, a license refers to any kind of license, permit, or document needed to operate in a particular geographic location. Various federal, state, county, and city government agencies issue different types of licenses to ensure that entities follow government regulations and industry standards for public safety. Typically, a government agency grants a license upon receiving required documentation, conducting an initial inspection, and requiring additional documentation and inspections on a defined time interval basis.

Depending on the geographic region, these government agencies may regulate air quality, water quality, soil quality, or other environmental aspects such as noise levels, radiation levels, or the like. For example, many jurisdictions require certain entities to obtain special licenses related to pollution control, such as producing, storing, transporting, or disposing of hazardous materials, burning toxic materials, using chemical processes during production, releasing ground waste, using products that produce environmentally damaging gases, or in any other way discharging pollutants into air, water, or soil.

SUMMARY

According to one illustrative embodiment, a computer-implemented method for managing licenses is provided. A computer receives evidence required for compliance with conditions set forth in a license from a client device of a designated user via a network. The computer, using machine learning, performs an analysis of the evidence based on a set of criteria to determine whether the evidence is valid. The computer, using machine learning, determines whether the evidence is valid based on the analysis of the evidence. The computer sends the evidence required for the compliance with the conditions set forth in the license to a regulatory agency via the network to maintain the license for an entity in response to the computer determining that the evidence is valid based on the analysis of the evidence. According to other illustrative embodiments, a computer system and computer program product for managing licenses are provided.

BRIEF DESCRIPTION OF THE DRAWINGS

FIGS. 4A-4B are a flowchart illustrating a process for managing licenses in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
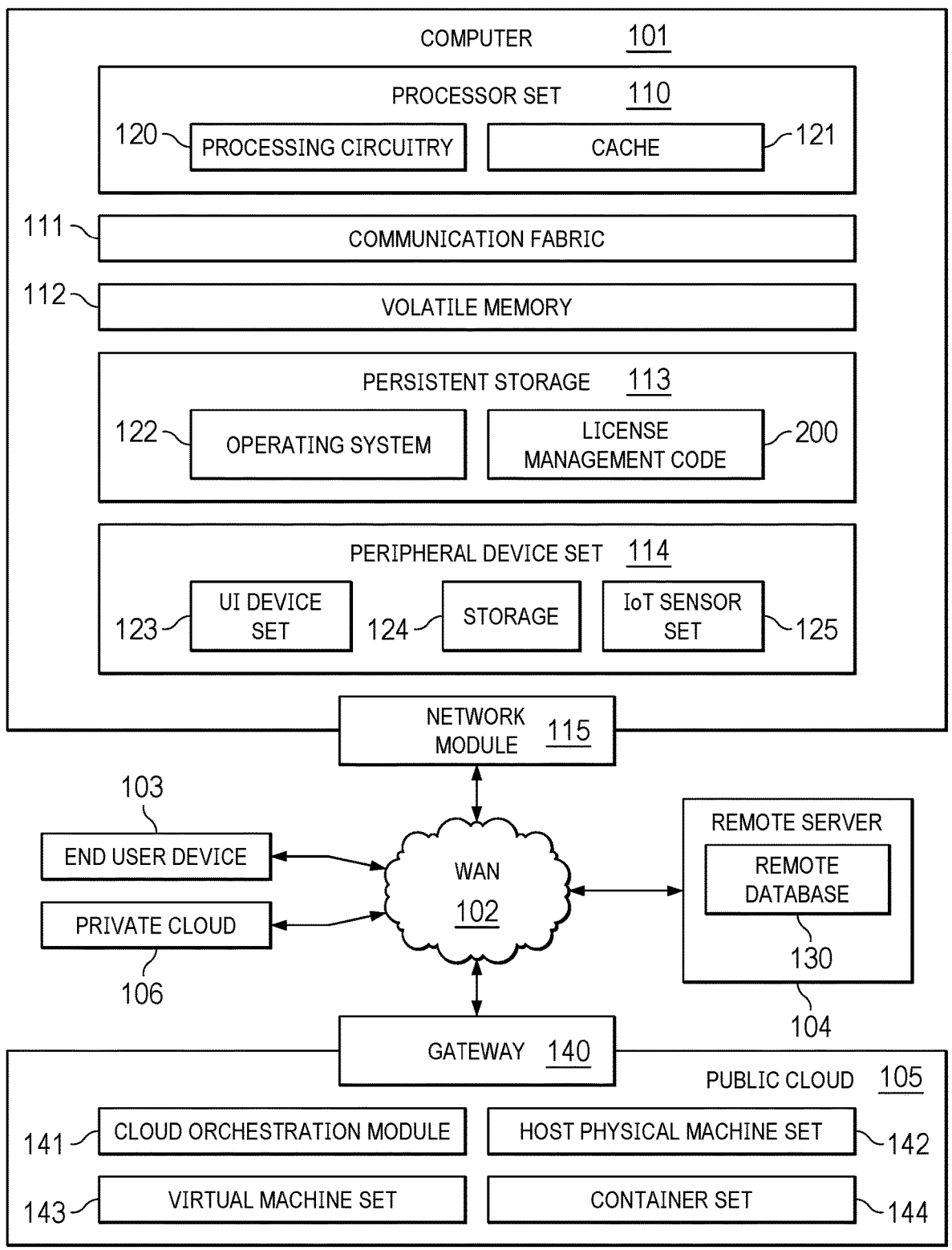
FIG. 1 is a pictorial representation of a computing environment in which illustrative embodiments may be implemented.
Figure 2:
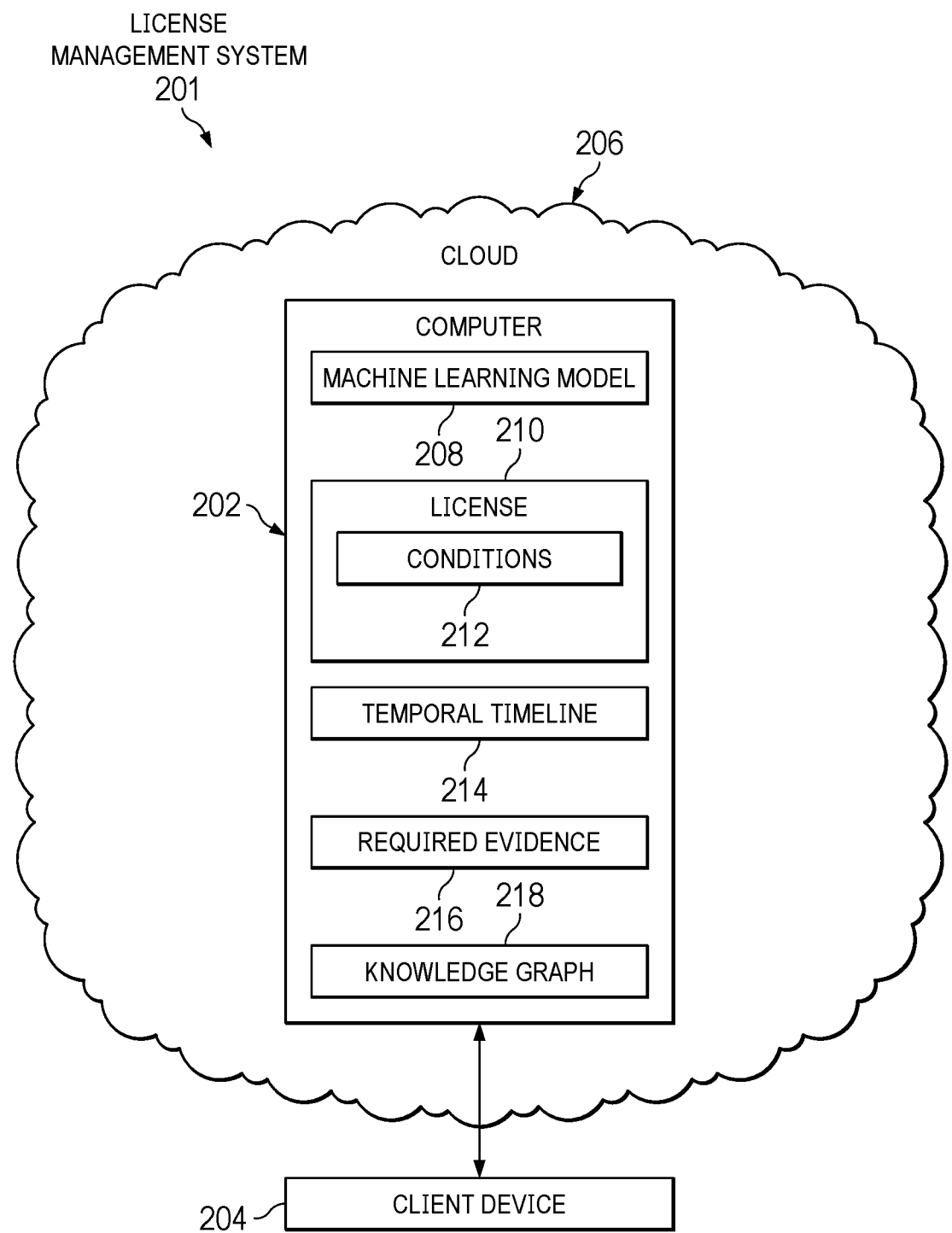
FIG. 2 is a diagram illustrating an example of a license management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as license management code 200. Taking care of the environmental license requirements for the operation of each industrial plant corresponding to a large national or international entity demands significant management and validation effort. For example, one entity can have multiple environmental licenses, each environmental license having different regulatory requirements and conditions. Also, the management and validation of these environmental licenses are susceptible to issues, such as, for example, human error or the like. License management code 200 utilizes machine learning to automatically analyze and validate not only the environmental license, but also any evidence needed to substantiate that the entity is in compliance with the regulatory guidelines and conditions to maintain each environmental license granted to the entity. License management code 200 utilizes the machine learning to automatically extract information from the environmental license and apply the extracted information to a temporal timeline for evidence collection and submission to maintain each particular environmental license. Thus, license management code 200 provides end-to-end license lifecycle management of each respective environmental license avoiding any potential risk when providing evidence of compliance to a regulatory government agency. However, it should be noted that an environmental license is meant as an example only and not as a limitation on illustrative embodiments. For example, illustrative embodiments can apply license management code 200 to any type of license, permit, or document requiring evidence to prove compliance with conditions or terms set forth in the license, permit, or document.

In addition to license management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and license management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in license management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The license management code included in block 200 includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a user of the license management services provided by computer 101), and may take any of the forms discussed above in connection with computer 101. EUD 103 typically receives helpful and useful data from the operations of computer 101. For example, in a hypothetical case where computer 101 is designed to provide an evidence correction recommendation to the end user, this recommendation would typically be communicated from network module 115 of computer 101 through WAN 102 to EUD 103. In this way, EUD 103 can display, or otherwise present, the evidence correction recommendation to the end user. In some embodiments, EUD 103 may be a client device, such as thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide an evidence correction recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Environmental licensing is defined as an administrative procedure by which a regulatory government agency licenses, for example, industrial construction or expansion, operational activities, and the like that correspond to an entity that utilizes environmental resources (e.g., air, water, and/or soil) taking into consideration regulatory provisions and industrial standards applicable to each situation and geographic location. Management of the lifecycle of government-issued environmental licenses, which includes documentation of compliance with any conditions or regulatory requirements during the validity of these environmental licenses, are subject to audit on a regular basis.

Sometimes, issues arise related to, for example, human error such as failing to meet a submission deadline for required evidence to maintain an environmental license or providing the wrong evidence to show compliance with regulatory provisions and industrial standards. For example, a user provides a set of documents as evidence of compliance, but the set of documents has no relation to the conditions set forth in the environmental license. These types of issues can create the risk of legal exposure for an entity attempting to comply with the conditions or regulatory requirements corresponding to one or more environmental licenses.

Illustrative embodiments utilize machine learning to automatically extract and validate all information contained in an environmental license to avoid potential issues (e.g., inadvertent mistake or intentional action). In addition, illustrative embodiments make the management of an environmental license lifecycle more efficient. For example, illustrative embodiments automatically manage, process, and validate each piece of evidence needed to maintain an environmental license. For example, the granting regulatory government agency sets the life of a particular environmental license for a defined time period such as 1 year, 2 years, 3 years, 5 years, or the like. Further, the granting regulatory government agency requires that evidence showing compliance with the conditions of the environmental license is due on a defined time interval basis such as every month, 2 months, 6 months, or the like over the defined time period (i.e., life) of that particular environmental license.

In response to a user uploading an environmental license to a computer system, which is providing the license management services of illustrative embodiments, illustrative embodiments extract all the information from the environmental license using, for example, optical character recognition, natural language processing, or the like. Illustrative embodiments utilize machine learning to interpret the information extracted from the environmental license to determine the type of evidence required and when the evidence is to be submitted for compliance with the conditions and regulatory requirements of the environmental license. Illustrative embodiments generate a license lifecycle management workflow for the environmental license that indicates the evidence required and when the evidence is to be submitted based on the interpretation of the information extracted from the environmental license.

Based on the license lifecycle management workflow, illustrative embodiments generate a temporal timeline for evidence submission and condition compliance corresponding to the environmental license. In other words, illustrative embodiments generate a temporal timeline for the entire defined time period of the environmental license showing when the environmental license is valid and when each piece of required evidence needs to be provided to the granting regulatory government agency to demonstrate compliance with the conditions of the environmental license in order for the entity to maintain the environmental license. As an illustrative example, a regulatory government agency has granted an entity a pollution emission license, which is valid for one year. In order to comply with conditions set forth in the pollution emission license, the entity has to provide the regulatory government agency with required evidence every month over the one-year period to establish compliance and maintain the pollution emission license.

Illustrative embodiments generate the temporal timeline for the environmental license using a knowledge graph. Illustrative embodiments utilize the knowledge graph to correlate each piece of evidence with the environmental license and with the correct evidence submission point in the timeline. For example, the knowledge graph is comprised of a plurality of nodes. The central or root node of the knowledge graph represents the environmental license. Each peripheral or leaf node of the knowledge graph represents a submission point for required evidence to demonstrate compliance with one or more conditions of the environmental license. Also, an edge connecting the central node, which represents the environmental license, to a peripheral node, which represents a particular piece of evidence, can include a time value indicating when to submit that particular piece of evidence to the regulatory government agency.

Illustrative embodiments send a notification to the user regarding an approaching deadline for required evidence corresponding to the environmental license. In other words, illustrative embodiments notify the user when one or more pieces of evidence need to be submitted for the environmental license based on illustrative embodiments monitoring the temporal timeline. In response to receiving the notification, the user uploads the required evidence to the computer system. The required evidence may be, for example, a photographic image, a video, a textual document, sensor data, or any combination thereof.

In response to receiving the required evidence from the user, illustrative embodiments process and analyze the user-provided evidence. Illustrative embodiments utilize a plurality of different machine learning models to analyze the evidence. Each machine learning model is specific to a particular form or type of evidence (e.g., image, video, text, or sensor data).

Illustrative embodiments utilize the plurality of different machine learning models to analyze the evidence to determine whether the evidence is valid in order to preclude any issues (e.g., received image is not an expected image, quality of the received image is poor, received document does not contain the required information, user signature is not present on the document, or the like), which can create risk of the regulatory government agency voiding the environmental license. For example, if the evidence is an image, then illustrative embodiments use a convolutional neural network, deep learning model, or the like to analyze the evidence to verify that an expected object or element is present in the image. If the evidence is text, then illustrative embodiments utilize, for example, a set of language models such as natural language processing, natural language understanding, and the like to analyze the evidence to verify that the required information is present in the text. If the evidence is sensor data, then illustrative embodiments utilize, for example, a random forest model, regression neural network, or the like to analyze the evidence to verify that environmental standards for at least one of air quality, water quality, soil quality, noise levels, radiation levels, or the like are met. Illustrative embodiments can utilize an ensemble of machine learning models to analyze the evidence when the evidence includes at least one of a set of images, video, text, sensor data, or the like.

In response to illustrative embodiments verifying that the evidence is valid and relevant to the environmental license based on the analysis of the evidence utilizing the plurality of different machine learning models, illustrative embodiments correlate each piece of the verified evidence to the environmental license in the knowledge graph. Moreover, illustrative embodiments tag the environmental license and verified evidence as in compliance in the knowledge graph for a defined time interval of a plurality of time intervals comprising the entire lifecycle of the environmental license.

Furthermore, in response to illustrative embodiments determining that the evidence is invalid or irrelevant to the environmental license based on the analysis of the evidence utilizing the plurality of different machine learning models, illustrative embodiments provide feedback to the user. The feedback can include, for example, a compliance failure risk score for each piece of evidence not verified as valid, rationale for the compliance failure risk score, recommendations for any evidence corrective actions needed to be taken by the user, and the like. For example, illustrative embodiments can notify the user that illustrative embodiments did not recognize a provided document as required evidence and provide a reason for the rejection (e.g., not a valid signature on the provided document) or notify the user that there was an issue with a particular piece of evidence (e.g., poor image quality).

Moreover, illustrative embodiments can run in a blockchain network, and each environmental license and each piece of evidence can be a self-executing contract (e.g., a smart contract having coded computer components and functionality). The machine learning models extract all of the information from the environmental licenses and pieces of evidence and then validate this information automatically. Afterward, illustrative embodiments register this validated information in the blockchain network to avoid intentional user action, such as, for example, deception, cheating, and the like, or inadvertent user mistake. Accordingly, all transactions, environmental licenses, and pieces of evidence will be compliant and easy to audit in the blockchain network. This blockchain network can run automatically when new environmental licenses and new pieces of evidence are received. Furthermore, this blockchain network can be integrated with the IoT sensors to automatically obtain pieces of evidence when needed.

Thus, illustrative embodiments provide one or more technical improvements in machine learning model integration, which allows these contracts/license agreements to be self-executing preventing inadvertent mistake or intentional action via, for example, recording transactions such as compliance with an environmental license term on a distributed ledger. As a result, illustrative embodiments provide one or more technical solutions that have a technical effect and practical application with managing risk corresponding to failure to comply with conditions set forth in environmental licenses.

With reference now to FIG. 2, a diagram illustrating an example of a license management system is depicted in accordance with an illustrative embodiment. License management system 201 may be implemented in a computing environment, such as computing environment 100 in FIG. 1. License management system 201 is a system of hardware and software components for managing risk of failing to comply with conditions set forth in a license granted to an entity by a regulatory government agency.

In this example, license management system 201 includes computer 202 and client device 204. Computer 202 and client device 204 may be, for example, computer 101 and EUD 103 in FIG. 1. However, it should be noted that license management system 201 is intended as an example only and not as a limitation on illustrative embodiments. For example, license management system 201 can include any number of computers, client devices, and other devices and components not shown.

Also in this example, computer 202 is included in cloud 206. Cloud 206 may be, for example, public cloud 105 or private cloud 106 in FIG. 1. However, it should be noted that computer 202 does not have to be located in a cloud environment.

Computer 202 includes machine learning model 208. Machine learning model 208 represents a plurality of different machine learning models, such as, for example, a neural network, deep learning neural network, convolutional neural network, recurrent neural network, linear regression model, regression tree model, and the like. Computer 202 utilizes machine learning model 208 to analyze license 210 and extract conditions 212. License 210 can represent any type of license, permit, or document granted to an entity by a regulatory government agency. For example, license 210 can be an environmental license. Also, license 210 can represent a plurality of licenses granted to the entity.

Computer 202 receives license 210 from client device 204, which corresponds to the entity that was granted license 210. Conditions 212 represent the terms set forth in license 210. For example, conditions 212 can include a defined time period, such as 3 years, for when license 210 is valid, defined time intervals for submitting required evidence during the defined time period to show compliance and keep license 210 in force, the type and amount of evidence required to show compliance, and the like.

Based on conditions 212 of license 210, computer 202 generates temporal timeline 214 over the defined time period of license 210 indicating the defined time intervals for submitting required evidence 216. Based on monitoring temporal timeline 214, computer sends evidence submission notifications to client device 204 when a submission deadline for required evidence 216 is approaching. Required evidence 216 can be, for example, images, textual data, sensor data, or any combination thereof.

Upon receiving required evidence 216 from client device 204, computer 202 utilizes machine learning model 208 to analyze required evidence 216 to verify that the information contained in required evidence 216 is valid and relevant to license 210. After verifying that required evidence 216 is valid, computer 202 utilizes machine learning model 208 to correlate required evidence 216 with license 210 in knowledge graph 218 and tag required evidence 216 and license 210 as in compliance with conditions 212. Further, computer 202 can send required evidence 216 to the regulatory government agency to maintain license 210 for the entity.

Figure 3:
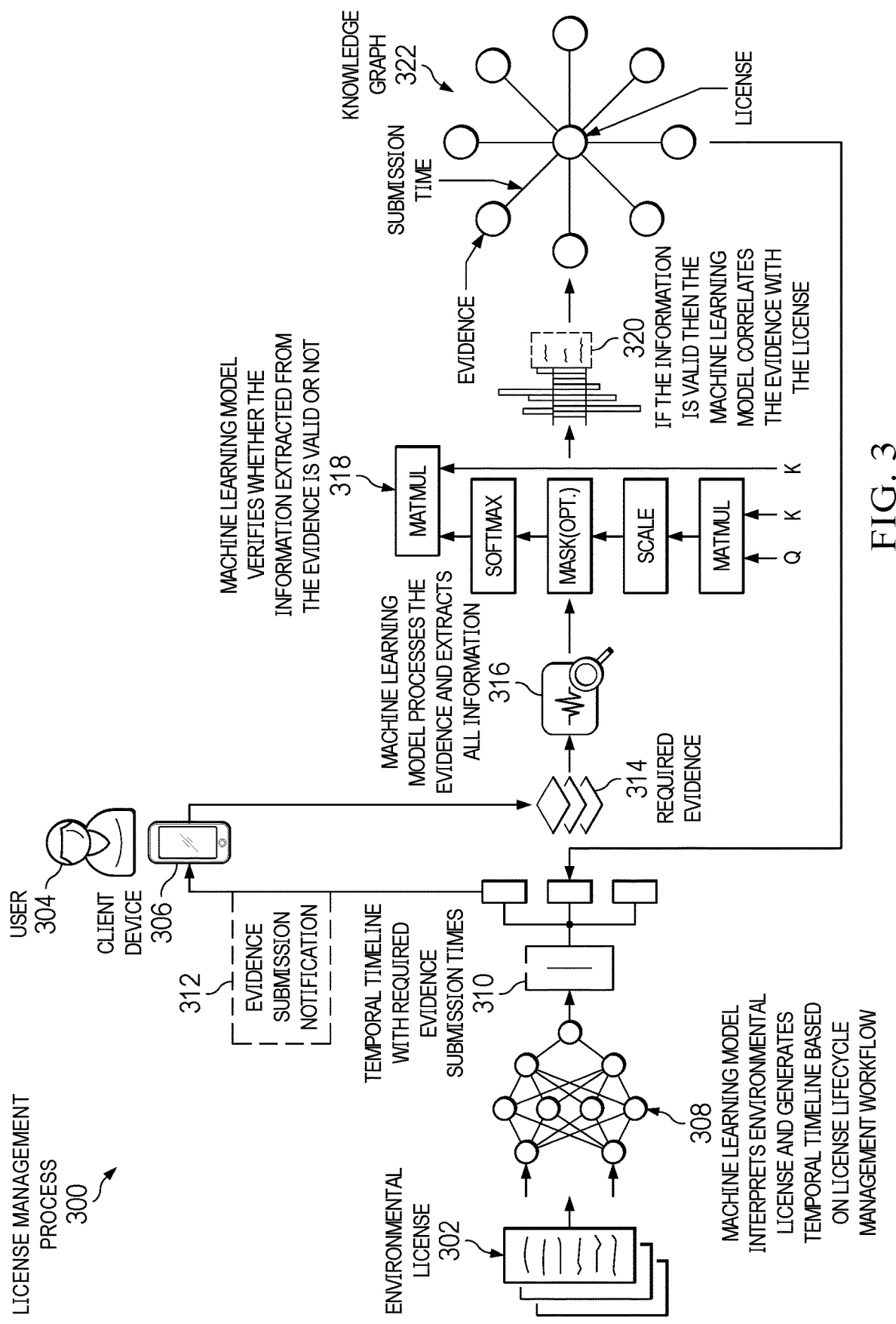
FIG. 3 is a diagram illustrating an example of a license management process in accordance with an illustrative embodiment.

With reference now to FIG. 3, a diagram illustrating an example of a license management process is depicted in accordance with an illustrative embodiment. License management process 300 can be implemented in a computer, such as, for example, computer 101 in FIG. 1 or computer 202 in FIG. 2 using license management code, such as, for example, license management code 200 in FIG. 1.

License management process 300 starts when the computer receives environmental license 302 from user 304 via client device 306. Environmental license 302 may be, for example, license 210 in FIG. 2. Client device 306 may be, for example, EUD 103 in FIG. 1 or client device 204 in FIG. 2.

In response to receiving environmental license 302, the computer uses machine learning model 308, such as, for example, machine learning model 208 in FIG. 2, to interpret environmental license 302 and generate temporal timeline 310 for environmental license 302 based on interpreting the information contained in environmental license 302. Temporal timeline 310 includes submission times for required evidence to comply with the conditions set forth in environmental license 302.

Based on monitoring temporal timeline 310, the computer sends evidence submission notification 312 to user 304 via client device 306 in response to the computer determining that a submission time for required evidence is approaching. In response to receiving evidence submission notification 312, user 304 sends required evidence 314 to the computer using client device 306. At 316, in response to receiving required evidence 314, the computer uses machine learning model 308 to process required evidence 314 to extract all the information contained in required evidence 314.

At 318, the computer uses machine learning model 308 to verify whether the information extracted from required evidence 314 is valid or not. At 320, if machine learning model 308 verifies that the information extracted from required evidence 314 is valid, then machine learning model 308 correlates required evidence 314 with environmental license 302 in knowledge graph 322. It should be noted that knowledge graph 322 is comprised of a plurality of nodes, where the center node represents the license, outer nodes represent different pieces of required evidence, and edges between the center node and respective outer nodes represent evidence submission times.

Figure 4B:
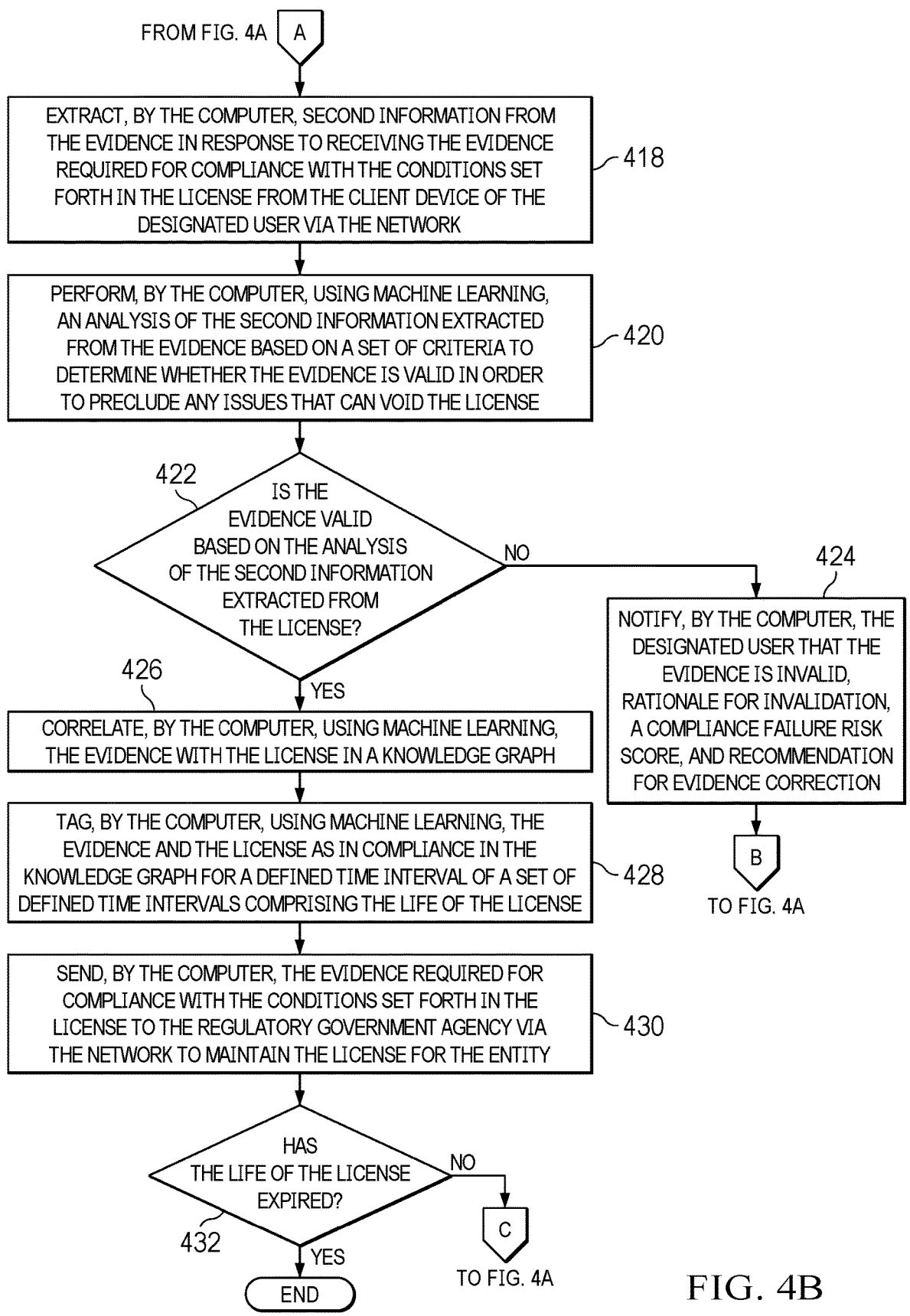

With reference now to FIGS. 4A-4B, a flowchart illustrating a process for managing licenses is shown in accordance with an illustrative embodiment. The process shown in FIGS. 4A-4B can be implemented in a computer, such as, for example, computer 101 in FIG. 1 or computer 202 in FIG. 2. For example, the process shown in FIGS. 4A-4B can be implemented in license management code 200 in FIG. 1.

The process begins when the computer receives a license granted to an entity by a regulatory government agency from a client device of a designated user corresponding to the entity via a network (step 402). The license can be, for example, an environmental license. In response to the computer receiving the license, the computer extracts first information from the license granted to the entity by the regulatory government agency (step 404).

The computer, utilizing machine learning, interprets the first information extracted from the license to determine the evidence required for compliance with conditions set forth in the license (step 406). In addition, the computer generates a license lifecycle management workflow corresponding to the license that indicates the evidence required and when the evidence is to be submitted during a life of the license based on interpreting the first information extracted from the license (step 408). Further, the computer generates a temporal timeline for submission of the evidence required for compliance with the conditions set forth in the license based on the license lifecycle management workflow (step 410).

Subsequently, the computer detects that a deadline for the submission of the evidence required for compliance with the conditions set forth in the license is approaching based on the computer monitoring the temporal timeline on a regular basis (step 412). The computer sends an evidence submission notification to the client device of the designated user via the network in response to the computer detecting that the deadline for the submission of the evidence required for compliance with the conditions set forth in the license is approaching (step 414).

Afterward, the computer receives the evidence required for compliance with the conditions set forth by the license from the client device of the designated user via the network (step 416). The computer then extracts second information from the evidence in response to receiving the evidence required for compliance with the conditions set forth by the license from the client device of the designated user via the network (step 418). The computer, using machine learning, performs an analysis of the second information extracted from the evidence based on a set of criteria to determine whether the evidence is valid in order to preclude any issues that can void the license (step 420).

The computer, using machine learning, makes a determination as to whether the evidence is valid based on the analysis of the second information extracted from the evidence (step 422). If the computer determines that the evidence is invalid based on the analysis of the second information extracted from the evidence, no output of step 422, then the computer notifies the designated user that the evidence is invalid, along with a rationale for the invalidation, a compliance failure risk score, and a recommendation for correction of the evidence (step 424). The compliance failure risk score indicates to the designated user the level of risk associated with failing to comply with the conditions set forth in the license if the designated user submits the evidence as is without correction to the regulatory government agency. Thereafter, the process returns to step 416 where the computer waits to receive the corrected evidence.

Returning again to step 422, if the computer determines that the evidence is valid based on the analysis of the second information extracted from the evidence, yes output of step 422, then the computer, using machine learning, correlates the evidence with the license in a knowledge graph (step 426). In addition, the computer, using machine learning, tags the evidence and the license as in compliance in the knowledge graph for a defined time interval of a set of defined time intervals comprising the life of the license (step 428). Further, the computer sends the evidence required for the compliance with the conditions set forth in the license to the regulatory government agency via the network to maintain the license for the entity (step 430).

Afterward, the computer makes a determination as to whether the life of the license has expired (step 432). If the computer determines that the life of the license has not expired, no output of step 432, then the process returns to step 412 where the computer waits to detect the next approaching deadline for evidence submission. If the computer determines that the life of the license has expired, yes output of step 432, then the process terminates thereafter.

Thus, illustrative embodiments of the present disclosure provide a computer-implemented method, computer system, and computer program product for managing risk of failing to comply with conditions set forth in a license granted to an entity by a regulatory government agency. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing licenses comprising:
   receiving, by a computer, evidence required for compliance with conditions set forth in a license from a client device of a designated user via a network;
   extracting, by the computer, compliance related data from the evidence using a convolutional neural network (CNN) trained on a dataset of labeled environmental compliance images to detect regulatory violations including at least one of pollutant emissions, hazardous material storage conditions, or industrial safety equipment presence, wherein the CNN outputs a confidence score for each detected regulatory violation;
   applying, by the computer, optical character recognition and natural language processing to extract textual compliance information from documents within the evidence;
   validating, by the computer, using a plurality of machine learning models comprising the CNN for image analysis and a set of language models for text analysis and a set of regression neural networks for sensor data analysis, the compliance related data against predefined regulatory standards stored in a knowledge graph comprising nodes representing licenses, evidence types, and evidence submission deadlines with edges indicating temporal relationships;
   automatically generating, by the computer, a compliance failure risk score based on detected discrepancies between the evidence and the predefined regulatory standards, wherein the compliance failure risk score indicates a probability of license revocation;
   correlating, by the computer, the validated compliance related data with a temporal evidence submission timeline generated for the license, wherein the temporal evidence submission timeline specifies evidence submission intervals over a life of the license;
   recording, by the computer, the validated compliance related data and risk score in an immutable blockchain ledger as a self-executing smart contract; and
   transmitting, by the computer, the validated compliance related data to a regulatory agency via a secure blockchain network to maintain the license for an entity, wherein the transmitting creates an auditable cryptographic record of compliance.

2. The computer-implemented method of claim 1, further comprising:
   receiving, by the computer, the license granted to the entity by the regulatory agency from the client device of the designated user corresponding to the entity via the network;
   extracting, by the computer, first information from the license; and
   interpreting, by the computer, utilizing machine learning, the first information extracted from the license to determine the evidence required for the compliance with the conditions set forth in the license.

3. The computer-implemented method of claim 1, further comprising:
   generating, by the computer, a license lifecycle management workflow corresponding to the license that indicates the evidence required and when the evidence is to be submitted during a life of the license.

4. The computer-implemented method of claim 1, further comprising:
   generating, by the computer, the temporal evidence submission timeline required for the compliance with the conditions set forth in the license.

5. The computer-implemented method of claim 4, further comprising:
   detecting, by the computer, that a deadline for the evidence submission required for the compliance with the conditions set forth in the license is approaching based on the computer monitoring the temporal evidence submission timeline; and
   sending, by the computer, an evidence submission notification to the client device of the designated user via the network in response to the computer detecting that the deadline for the evidence submission required for the compliance with the conditions set forth in the license is approaching.

6. The computer-implemented method of claim 1, further comprising:
   extracting, by the computer, second information from the evidence in response to receiving the evidence required for the compliance with the conditions set forth in the license from the client device of the designated user via the network; and
   performing, by the computer, using machine learning, analysis of the second information extracted from the evidence based on the set of criteria to determine whether the evidence is valid in order to preclude any issues that can void the license.

7. The computer-implemented method of claim 6, further comprising:
   notifying, by the computer, the designated user that the evidence is invalid, along with a rationale for invalidation, a compliance failure risk score, and a recommendation for correction of the evidence in response to the computer determining that the evidence is invalid based on the analysis of the second information extracted from the evidence.

8. The computer-implemented method of claim 7, wherein the compliance failure risk score indicates a level of risk associated with failing to comply with the conditions set forth in the license if the designated user submits the evidence as is without correction to the regulatory agency.

9. The computer-implemented method of claim 6, further comprising:
correlating, by the computer, using machine learning, the evidence with the license in a knowledge graph; and
tagging, by the computer, using machine learning, the evidence and the license as in compliance in the knowledge graph for a defined time interval of a set of defined time intervals comprising a life of the license.

10. The computer-implemented method of claim 1, wherein the license is an environmental license, and wherein the evidence includes at least one of a set of images, video, text, or sensor data.

11. A computer system for managing licenses comprising:
a communication fabric;
a storage device connected to the communication fabric, wherein the storage device stores program instructions; and
a processor connected to the communication fabric, wherein the processor executes the program instructions to:
receive evidence required for compliance with conditions set forth in a license from a client device of a designated user via a network;
extract compliance related data from the evidence using a convolutional neural network (CNN) trained on a dataset of labeled environmental compliance images to detect regulatory violations including at least one of pollutant emissions, hazardous material storage conditions, or industrial safety equipment presence, wherein the CNN outputs a confidence score for each detected regulatory violation;
apply optical character recognition and natural language processing to extract textual compliance information from documents within the evidence;
validate using a plurality of machine learning models comprising the CNN for image analysis and a set of language models for text analysis and a set of regression neural networks for sensor data analysis, the compliance related data against predefined regulatory standards stored in a knowledge graph comprising nodes representing licenses, evidence types, and evidence submission deadlines with edges indicating temporal relationships;
automatically generate a compliance failure risk score based on detected discrepancies between the evidence and the predefined regulatory standards, wherein the compliance failure risk score indicates a probability of license revocation;
correlate the validated compliance related data with a temporal evidence submission timeline generated for the license, wherein the temporal evidence submission timeline specifies evidence submission intervals over a life of the license;
record the validated compliance related data and the compliance failure risk score in an immutable blockchain ledger as a self-executing smart contract; and
transmit the validated compliance related data to a regulatory agency via a secure blockchain network to maintain the license for an entity, wherein the transmit creates an auditable cryptographic record of compliance.

12. The computer system of claim 11, wherein the processor further executes the program instructions to:
receive the license granted to the entity by the regulatory agency from the client device of the designated user corresponding to the entity via the network;
extract first information from the license; and
interpret, utilizing machine learning, the first information extracted from the license to determine the evidence required for the compliance with the conditions set forth in the license.

13. The computer system of claim 11, wherein the processor further executes the program instructions to:
generate a license lifecycle management workflow corresponding to the license that indicates the evidence required and when the evidence is to be submitted during a life of the license.

14. The computer system of claim 11, wherein the processor further executes the program instructions to:
generate the temporal evidence submission timeline required for the compliance with the conditions set forth in the license.

15. The computer system of claim 14, wherein the processor further executes the program instructions to:
detect that a deadline for the evidence submission of the evidence required for the compliance with the conditions set forth in the license is approaching based on monitoring the temporal evidence submission timeline; and
send an evidence submission notification to the client device of the designated user via the network in response to detecting that the evidence submission deadline for the evidence submission required for the compliance with the conditions set forth in the license is approaching.

16. A computer program product for managing licenses comprising a computer-readable storage medium having program instructions embodied therewith, the program instructions executable by a computer to cause the computer to:
receive evidence required for compliance with conditions set forth in a license from a client device of a designated user via a network;
extract compliance related data from the evidence using a convolutional neural network (CNN) trained on a dataset of labeled environmental compliance images to detect regulatory violations including at least one of pollutant emissions, hazardous material storage conditions, or industrial safety equipment presence, wherein the CNN outputs a confidence score for each detected regulatory violation;
apply optical character recognition and natural language processing to extract textual compliance information from documents within the evidence;
validate, using a plurality of machine learning models comprising CNN for image analysis and a set of language models for text analysis and a set of regression neural networks for sensor data analysis, the compliance related data against predefined regulatory standards stored in a knowledge graph comprising nodes representing licenses, evidence types, and evidence submission deadlines with edges indicating temporal relationships;
automatically generate a compliance failure risk score based on detected discrepancies between the evidence and the predefined regulatory standards, wherein the compliance failure risk score indicates a probability of license revocation;

correlate, by the computer, the validated compliance related data with a temporal evidence submission timeline generated for the license, wherein the temporal evidence submission timeline specifies evidence submission intervals over a life of the license;

record the validated compliance related data and the compliance failure risk score in an immutable blockchain ledger as a self-executing smart contract; and transmit the validated compliance related data to a regulatory agency via a secure blockchain network to maintain the license for an entity, wherein the transmit creates an auditable cryptographic record of compliance.

17. The computer program product of claim 16, wherein the program instructions further cause the computer to:

receive the license granted to the entity by the regulatory agency from the client device of the designated user corresponding to the entity via the network;

extract first information from the license; and interpret, utilizing machine learning, the first information extracted from the license to determine the evidence required for the compliance with the conditions set forth in the license.

18. The computer program product of claim 16, wherein the program instructions further cause the computer to:

generate a license lifecycle management workflow corresponding to the license that indicates the evidence required and when the evidence is to be submitted during a life of the license.

19. The computer program product of claim 16, wherein the program instructions further cause the computer to:

generate a temporal timeline for the evidence submission required for the compliance with the conditions set forth in the license.

20. The computer program product of claim 19, wherein the program instructions further cause the computer to:

detect that a deadline for the evidence submission required for the compliance with the conditions set forth in the license is approaching based on monitoring the temporal timeline; and send an evidence submission notification to the client device of the designated user via the network in response to detecting that the deadline for the submission of the evidence required for the compliance with the conditions set forth in the license is approaching.

* * * * *